(12) United States Patent
Chen et al.

(10) Patent No.: US 7,936,720 B2
(45) Date of Patent: May 3, 2011

(54) ACTIVE SET MANAGEMENT ENHANCEMENT FOR RELIABLE SOFT HANDOFF IN 1XEV-DO SYSTEM

(75) Inventors: Xixian Chen, Nepean (CA); Weigang Li, Nepean (CA); Vasanta Chivukula, Nepean (CA); Shiva Mirzaei-Rezaei, Kanata (CA); Brian Troup, Richardson, TX (US); Miroslav Budic, Murphy, TX (US); Yong Zhou, Kirkland (CA); Ryan Santa, Kanata (CA)

(73) Assignee: Nortel Networks Limited, Mississauga, ON (CA)

( * ) Notice: Subject to any disclaimer, the term of this patent is extended or adjusted under 35 U.S.C. 154(b) by 743 days.

(21) Appl. No.: 11/412,959

(22) Filed: Apr. 28, 2006

(65) Prior Publication Data
US 2006/0245407 A1 Nov. 2, 2006

Related U.S. Application Data

(60) Provisional application No. 60/676,382, filed on Apr. 29, 2005.

(51) Int. Cl.
*H04W 4/00* (2009.01)

(52) U.S. Cl. ...................................................... 370/331

(58) Field of Classification Search .................. 370/324, 370/468, 331–334, 328, 329; 455/450, 436–444
See application file for complete search history.

(56) References Cited

U.S. PATENT DOCUMENTS

| | | | |
|---|---|---|---|
| 5,101,501 A * | 3/1992 | Gilhousen et al. | 455/442 |
| 5,434,853 A * | 7/1995 | Hemmady et al. | 370/331 |
| 5,726,978 A * | 3/1998 | Frodigh et al. | 370/252 |
| 6,195,552 B1 * | 2/2001 | Jeong et al. | 455/436 |
| 6,714,784 B1 * | 3/2004 | Forssell et al. | 455/436 |
| 6,993,359 B1 * | 1/2006 | Nelakanti et al. | 455/554.1 |
| 7,356,749 B2 * | 4/2008 | Dominique et al. | 714/748 |
| 7,437,159 B1 * | 10/2008 | Yarkosky et al. | 455/436 |
| 2006/0109818 A1 * | 5/2006 | Ramanna et al. | 370/331 |

* cited by examiner

*Primary Examiner* — Derrick W Ferris
*Assistant Examiner* — Mang Yeung
(74) *Attorney, Agent, or Firm* — Barnes & Thornburg LLP (57) ABSTRACT

A method and system for connection management in a wireless data network, such as a 1xEV-DO network adds connections to new network sectors upon receipt of a connection request from an active terminal, but removes data connections that the active terminal requests to be dropped only after confirmation from the active terminal that a channel allocation message has been received and applied. The active network maintains an active set of connections that is at least as large as the active set maintained by the active terminal and does not initiate a connection termination if no confirmation of the channel allocation message is received. This allows for a reduction in the number of dropped connections.

22 Claims, 5 Drawing Sheets

ACTIVE SET MANAGEMENT ENHANCEMENT FOR RELIABLE SOFT HANDOFF IN 1XEV-DO SYSTEM

CROSS REFERENCE TO RELATED APPLICATIONS

This application claims the benefit of priority of U.S. Provisional Patent Application No. 60/676,382 filed Apr. 29, 2005, which is incorporated herein by reference.

FIELD OF THE INVENTION

The present invention relates generally to wireless communications. More particularly, the present invention relates to data channel management in a wireless data network such as 1x Evolution-Data Optimized (1xEV-DO) wireless networks.

BACKGROUND OF THE INVENTION

Wireless telephony services have historically treated data and voice transmission differently. This was logical as the demands on such services differed. As data transmission was introduced to mobile telephony networks, it was a low bandwidth solution that was almost an after thought. As voice and data services evolved, voice was still considered as the primary service offered by the network, and certain accommodations were provided to ensure consistency and reliability to the voice network.

In voice communications, dropping a connection is a measure of last resort. It is commonly accepted that a noisy voice connection is preferable to no connection at all. However, data connections are treated differently. Dropping a data connection is often seen as an acceptable action as the data packets missed due to the dropped connection can be retransmitted. This typically is not even noticeable to the user, who at worst will be inconvenienced for a matter of seconds while a dropped data connection is re-established and the data re-requested.

With the arrival of true high speed data networks, such as 1xEV-DO networks, wireless data connections are now suitable for a number of uses that were previously unsuitable to wireless data connections. This has led to an increase in the utility of the wireless data networks.

In 1xEV-DO systems, the common cellular structure of wireless telephony networks is maintained. Each sector is assigned a unique pseudo random number code (PN code). This PN code is used by both mobile access terminals (AT) and the underlying access network (AN) to specify a particular sector in the network.

The AN maintains a list of PNs associated with each AT that has a data connection. This list is mirrored in the AT. The list of PNs forms an active set used by the AT and the AN for transmitting and receiving data packets. During the connection between the AT and the AN, the AT monitors the strength of pilot signals from surrounding sectors. When the pilot strength of any sector crosses a threshold, a route update (RU) message is sent to the AN. Two thresholds are commonly set, a Pilot_ADD and a Pilot_DROP threshold. When a pilot signal is detected with a signal strength higher than the Pilot_ADD threshold the PN associated with the sector transmitting the pilot signal is submitted to the AN as a sector that the AT can access. Similarly, when an already monitored signal is determined to have dropped below the Pilot_DROP threshold, the AN is informed that it can drop the PN from the active set associated with the AT.

The present handling of adding and dropping sectors in networks such as the 1xEV-DO network, often result in dropped data connections. Although in an environment, where the data network is used purely for non-time critical data delivery, this is not a great impediment. However, as data transmission rates have increased, the data network can serve other uses, including time critical uses such as carrying Voice over Internet Protocol (VoIP) based calls and video telephone applications. VoIP calls provide voice service to users over the data portion of the network. VoIP calls can easily be supported by networks such as the 1xEV-DO deployments, but cannot offer users the required reliability unless the data connection is as secure as a voice channel. Although dropping a standard data connection, such as a request for a webpage, is only seen as an inconvenience, dropping the data connection that carries a VoIP data stream is equivalent to dropping a voice channel, which is commonly seen as a highly undesirable action. To allow for connection reliant services such as VoIP, a more robust data connection management method is required It is, therefore, desirable to provide a method and system for reducing the number of dropped data connections in a wireless data network.

SUMMARY OF THE INVENTION

It is an object of the present invention to obviate or mitigate at least one disadvantage of previous wireless data connection mechanisms.

In a first aspect of the present invention, there is provided a method of managing connections between an active terminal and connection points in a wireless data network. Upon receipt of a routing update message, the active network examines conditions associated with the message and then determines a course of action to follow instead of simply issuing connection terminations. These decisions allow for a greater reliability for the data connection. The route update message can include connection addition and termination requests as well as requests to maintain existing connections. The connection addition requests can include a pseudorandom number associated with a sector with an associated status of "keep=yes" or "add". Connection termination requests can include a pseudorandom number associated with a sector serving as a connection point with an associated status of "keep=no".

If the serving sector for the active terminal that issues the route update message is associated with a connection termination request, the request can be ignored, or the sector can be marked for deletion after a new serving sector has been designated. This prevents abrupt terminations when a serving sector pilot signal strength temporarily drops. If all the sectors in the route update message have associated connection termination requests, the request can be ignored, as the situations that typically cause this to occur are usually persistent for short periods of time.

When handling a connection addition request, the active network can check for the availability of resources in the sector that the connection request is associated with. If the resources are available, they are allocated to the active terminal and a channel allocation message is issued to the active terminal. The channel allocation message includes the active set of connection channels for the active terminal to use. In response to successful receipt of the channel allocation message, the active terminal will issue a confirmation of receipt, such as a traffic channel complete message. If this confirmation is not received, the channel allocation message can be reissued. The drop connection requests will only be honored in the active network upon receipt of the confirmation message. This ensures that the active set maintained by the active network will include at least the connection channels that the active terminal has in its active set if no confirmation is received.

When a route update message is received and connections in the active set maintained by the active network are missing from the route update message, the active network can immediately release the resources allocated for those connections.

The above-described methods, and systems for implementing the above-described system, put an emphasis on maintaining data connections instead of a singular focus on reducing the unused resources in the network. This diminishes the occurrence of disconnecting active terminals from the data network unless they formally request disconnection, or have been inactive and are thus subject to mechanisms such as inactivity timers. Such an emphasis on maintaining the data connection allows the data connection to be used for services such as VoIP and video telephony applications which would otherwise suffer from a large number of dropped connections.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for managing connections in a wireless data network by revised handling of route update messages.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

When an RU message is sent to the AN, it contains a list of PN codes that the AN should associate with the AT. Typically there are a number of status codes that can be used. In some implementations, three codes are defined, ADD, keep=yes, and keep=no. ADD is used when a new pilot signal with a strength over the Pilot_ADD threshold is detected and the AT wants the PN added to its active set with the AN. keep=yes is used to indicate that a PN already in the active set should be maintained in the active set. keep=no is used to indicate to the AN that a pilot signal has fallen below the Pilot_DROP threshold for a certain time period and that the AT no longer can properly connect to the sector. To allow for efficient resource allocation, the AN will remove the PN from the connection set associated with the AT so that the sector associated with the PN can allow another user to connect to it.

In the 1xEV-DO standard, the ADD and keep=yes conditions are collapsed into a single condition with the AN determining that a PN with status keep=yes that was not in the active sector list associated with the AT should be added to the active sector list.

Because the AN determines the active set of sector PNs in conjunction with RUs received from the AT, the active set in the AN is the same as that stored in the AT.

When AN receives an RU from AT, it updates the active set associated with the AT using the information in the RU. If a PN is received with condition ADD, AN checks the resources of the sector associated with the PN to see if there are sufficient resources available in that sector to allow for a connection to be created. If sufficient resources are available, the PN is added to the active set, so that the AT can begin connecting to the sector.

Figure 1:
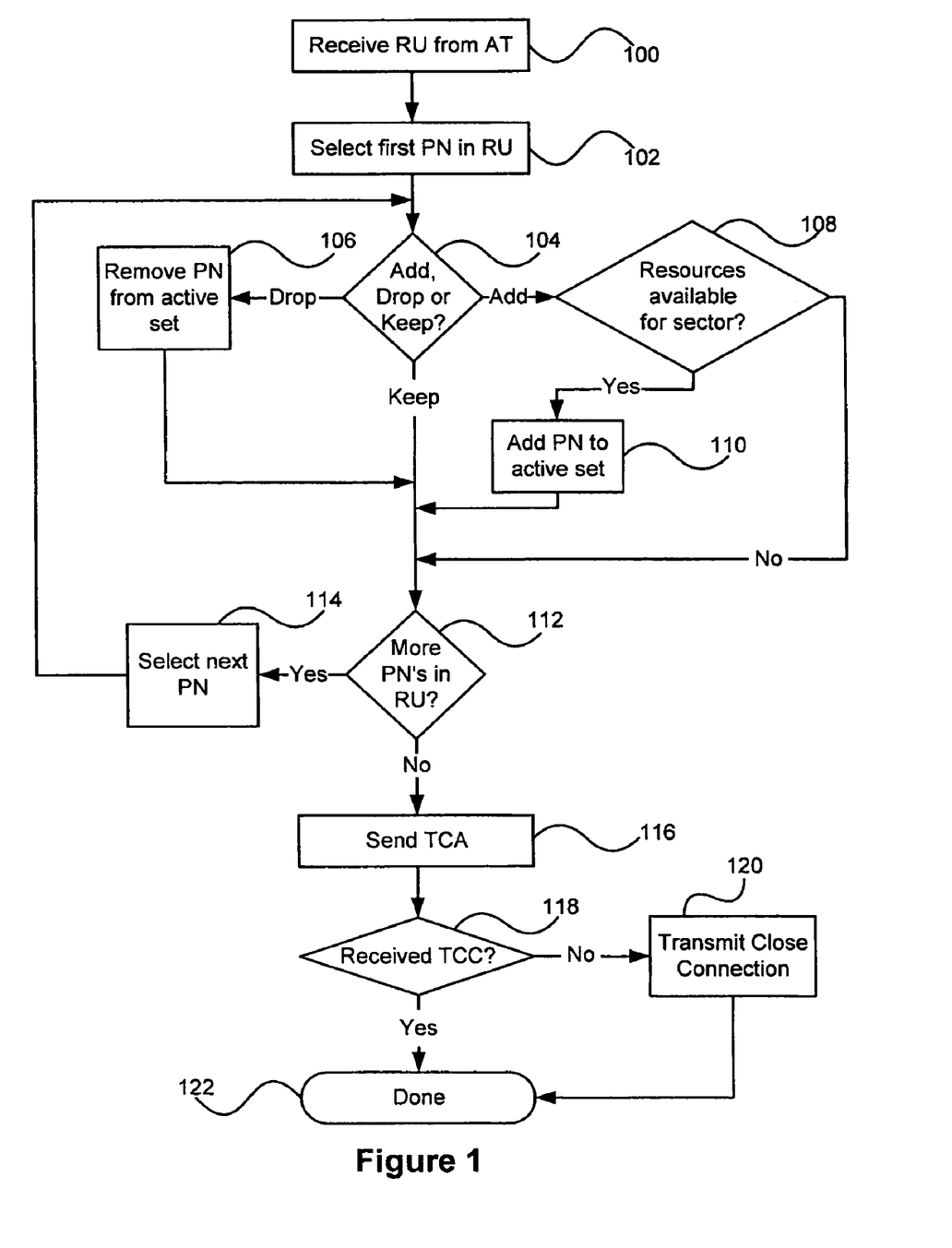
FIG. 1 is a flowchart illustrating a method of connection management.

FIG. 1 illustrates a serialized method of updating the active set and sending a traffic channel allocation (TCA) message to the AT in response to receipt of the RU. In step 100 an RU is received from the AT, and the AN examines the RU to extract the first PN in step 102. A determination of whether or not the selected PN is added, dropped or kept is made in step 104. If a PN is in the active set and is to be kept, the process continues to step 112 where a determination of whether or not further PNs are in the RU. No action is taken with regard to the active set if a PN is in the active set and it is to be kept. If, in step 104, it is determined that the PN selected in step 102 is to be dropped, the PN is removed from the active set in step 106, and the process continues to determination 112. If a determination is made in step 104 that the selected PN is to be added, AN determines if resources are available in sector 108 to support the connection. If the resources are available, the PN is added to the active set in 110, and the process continues to step 112. If insufficient resources are available in the sector, then no changes are made to the active set and the process continues to step 112. As described above, in step 112, AN determines if there are more PNs in the RU. If there are, the next PN in the RU is selected in step 114, and the process returns to step 104 for the newly selected PN. If, in step 112, it is determined that there are no more PNs in the RU, the AN sends a TCA to the AT in step 116. The TCA contains the AN's active set, and allows the AT to initiate connections with new sectors. This dynamic process of adding and dropping sectors, allows an AT to maintain connection to a plurality of different sectors which allows for soft handoffs to minimize the number of unnecessarily dropped connections.

After sending the TCA transmitted in step 116, the AT can update its active set, so that the active set in the AT is the same as the active set in the AN. To indicate that the TCA has been received, and the active set has been updated, the AT typically transmits a traffic channel complete (TCC) message to the AN. In step 118, the AN determines whether or not the TCC has been received. Typically, the AN defines a time window in which the TCC must be received. If no TCC is received within this time window, the AN transmits a close connection command to the AN in step 120. If the TCC has been received, or following the transmission of the close connection command, the process terminates in step 122 until the next RU is received from the AT.

The close connection command is issued in the absence of receipt of the TCC to force the AT to reestablish the connection, so that the AN is not left with open connections in each sector if the AT is deactivated after sending the RU. However, in a large number of instances, the TCC may not be received due to bad channel conditions on either the forward or reverse links. When this occurs, the AN sends a connection close message to the AT which requires the AT to drop the connection. Analysis of empirical field data shows that over 15% of data connection terminations are caused by the TCC not being received by the AN. As noted previously, where a time critical service is employed over the data connection, these connection terminations are noticeable by the user, and should be considered the equivalent to dropping a voice call.

The AT connects to the AN through a plurality of different sectors when possible, but one of the sectors is designated as the serving sector. This sector is used by the AN to transmit data to the AT, which transmits data to the AN using all available sectors. Thus, the AN only transmits data to the AT through the sector that the AT designates as its serving sector. The AN will, however, transmit reverse-link power control bits, reverse activity bits and other MAC signals to the AT using all of the sectors in the active set. Typically the serving sector is selected by the AT from the active set based on the strength of the signals from all accessible sectors. The AT indicates its preference for a serving sector using the data rate control (DRC) channel. The message transmitted through the DRC includes the data rate along with the serving sector information. After the DRC is decoded by the AN, the AN will use the decoded information to transmit data packets to the AT over the correct servicing sector at the correct data rate.

Analysis of connection dropping in 1xEV-DO implementations has shown that in a number of instances, usually associated with temporary channel problems, an AT will issue an RU instructing the AN to drop the serving sector from the active set. Typically this occurs prior to the AT asking for the serving sector to be changed if the degradation in service quality is sudden. In response to this, the AN will remove the PN for the serving sector from the active set and issue the TCA to the AT. This will result in a termination of service, when in fact the interruption in service is often very short lived.

In conventional applications of connection management, calls are dropped when the TCC is not successfully received or decoded by the AN, when the serving sector PN is given a status of keep=no by the AT, and when the PN codes corresponding to all the sectors in the active set have been given a status of keep=no.

To allow data services to provide a more reliable connection so that they can support services such as VoIP an increase in reliability in the availability of data connections is desirable. The following methods, and systems for executing them, can provide for a reduction in the number of dropped connections. These methods and systems can be implemented as part of the network infrastructure without requiring any changes on deployed AT devices. A modified active set management system and method seek to address some of the deficiencies of the prior art.

In the modified active set management system, priority is given to maintain connections. The AN will attempt to avoid sending connection close messages where not strictly necessary.

Figure 2:
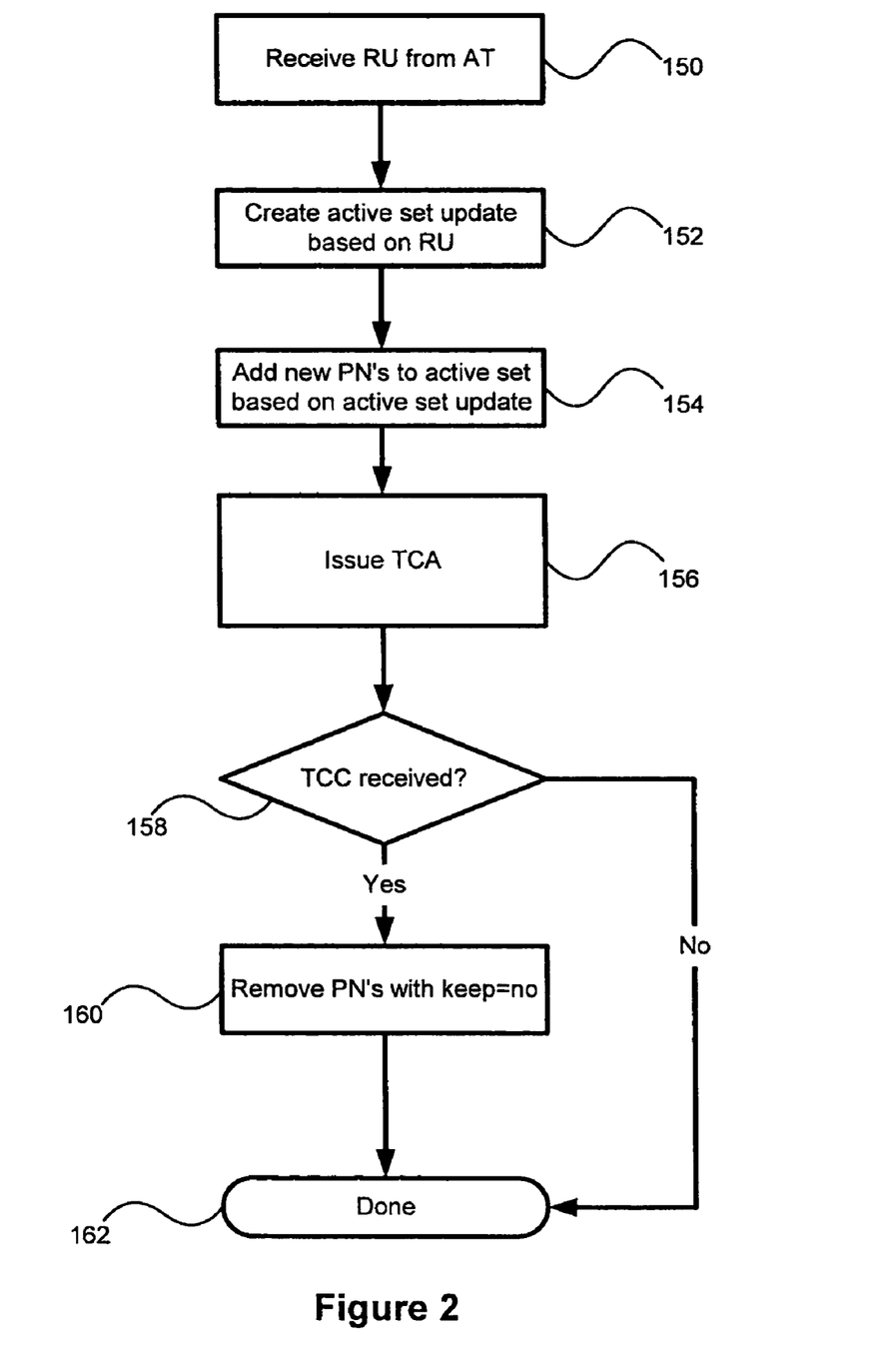
FIG. 2 is a flowchart illustrating a method of updating an active set in response to a route update message.

As illustrated in the flowchart of FIG. 2, the AN receives a RU from an AT in step 150. Based on this RU, an active set update is created in step 152. The update includes a list of the PNs to be added and removed from the active set associated with the AT. Instead of simply proceeding to updating the active set and then issuing the TCA, the AN adds the new PNs to the active set in step 154. The TCA, based on the active set update is issued in step 156. In step 158, the determination of whether or not the TCC has been received is made. If the TCC has been received, the PNs with the status of keep=no in the active set update are removed from the active set in step 160. At this point, the AT and the AN have the same active set, and the process terminates at step 162. However, if the TCC is not received, the PNs are not removed and the process terminates at step 162, and the active set in the AN is either equal in size, or a superset of the active set in the AT. The AN, in both cases then awaits the receipt of another RU from the AT.

To increase the likelihood that the TCC is received, the AN can reissue the TCA if no TCC is received. This retransmission can be done upon the expiry of the TCC counter, and can be repeated either an indefinite number of times, or for a fixed number of times. If an AT had already received a TCA and issued a TCC that simply was not received, the subsequently received TCA would simply contain the same active set, and no connection changes would be made but a new TCC would be issued.

In cases where the AN adds PNs to the active set, and transmits the TCA to the AT, but does not receive the TCC, two possibilities may have occurred. In the first instance, the AT may not have received the TCA, while in the second instance, the TCC may be have been issued but then either corrupted or lost in transit (likely due to interference in the channel). In the first instance, the AT will not have updated its active set based on the TCA, but by only adding to its active set, the AN will ensure that the AT has at worst a subset of the available connections. Thus, the AT will still be able to connect, and will in due course issue another RU. Thus, a dropped connection is avoided. In the instances where the AT updates its active set and the TCC is not received, the active set maintained by the AN will include all the PNs in the active set maintained by the AT. From the perspective of the AN, the AT may or may not use the resources allocated to it, but any resources that it does use will be allocated. One skilled in the art will appreciate that the step of adding new PNs to the active set (step 154) can include adding the PN to the active set only when sufficient resources in the sector are available.

As discussed above, PNs can be added to the active set to allocate resources to the AT without confirmation, but should not removed from the active set unless the AT confirms their removal with the TCC. This ensures that the AT can connect, at the slight cost of resource allocation during the time period between issuance of a TCA and a timeout that would result in the AT re-issuing an RU.

In one implementation, a check can be applied to ensure that an AT does not request removal of the PN associated with the serving sector. In one such implementation, step 152 examines the PNs in the RU and ignores any changes to the PN associated with the serving sector. Thus, the TCA issued to the AT instructs the AT to maintain a connection with its serving sector despite poor connection characteristics. In instances where the connection to the serving sector cannot be maintained, the AT will typically request a new serving sector prior to reissuing the RU. A second RU would then be issued requesting removal of the former serving sector. By willfully ignoring requests to drop the serving sector the AN prevents the AT from causing an unplanned service interruption.

Figure 3:
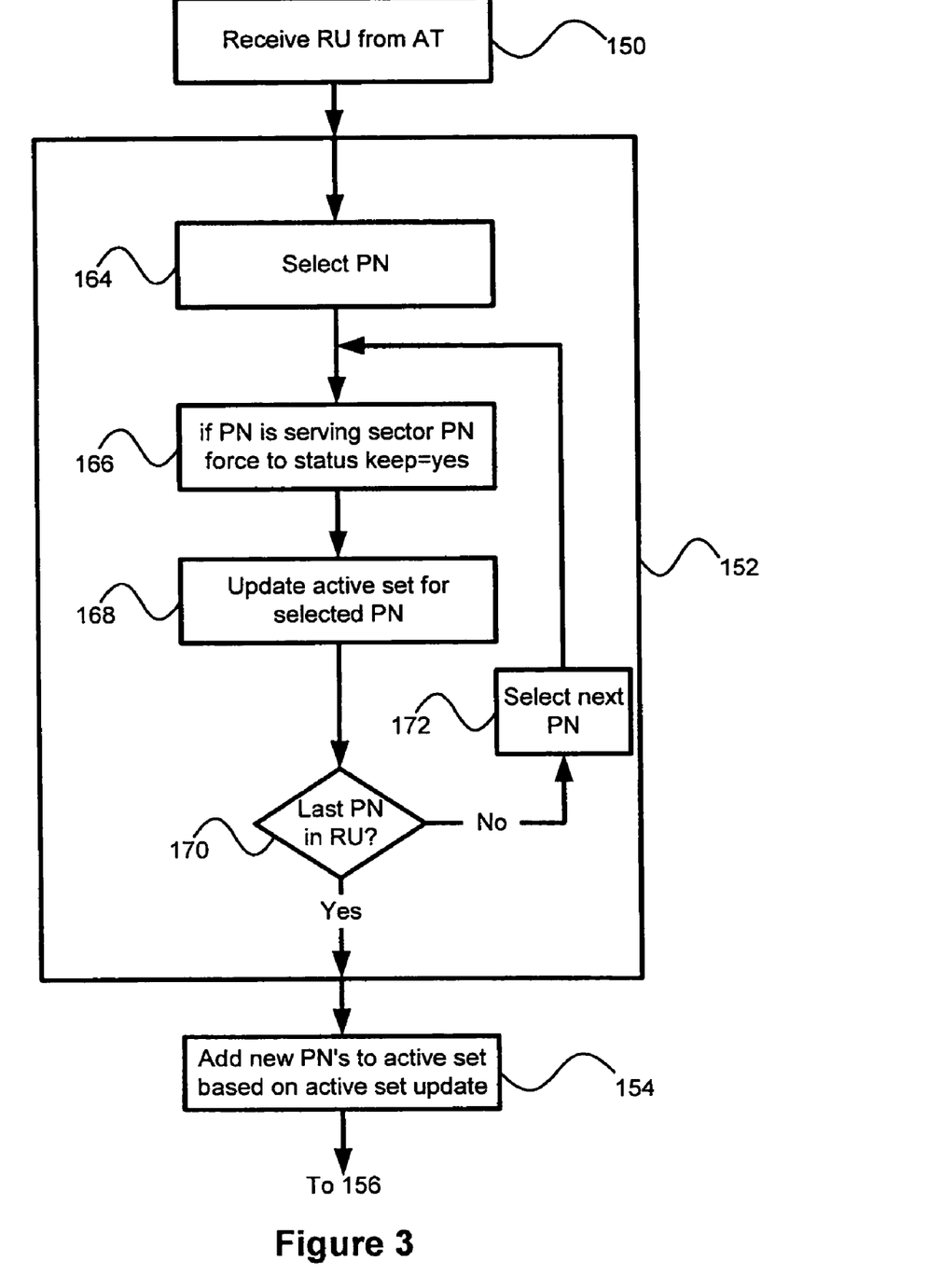
FIG. 3 is a flowchart illustrating a method of composing an active set update.

FIG. 3 illustrates one implementation of the above-described method. In step 150, the RU is received from the AT. In step 152, a first PN is selected from the RU in step 164. In step 166 the status is forced to keep=yes if the PN is associated with the serving sector. The PN and status is added to the active set update in step 168. In step 170 a determination is made as to whether or not the PN is the last PN in the RU. If the PN is not the last PN, another PN is selected in step 172 and the process goes back to step 166. When the last PN has been processed, the process continues to step 154.

When a serving sector PN has been preserved in the manner, the AN may chose to initiate a removal of the PN from the active set when the AT has designated a new serving sector. Alternatively, the AN may leave the serving sector PN in the TCA, and wait until the AT requests it be dropped in an RU issued after a new serving sector has been designated.

One skilled in the art will appreciate that the TCA issued to the AT will typically contain only those PNs whose status is set to keep=yes. The PNs whose status is set to keep=no will then be deleted from the active set maintained by the AN when the TCC is received.

Because an AT can remove a PN from its active set without the AN doing so, the AN will receive RUs from the AT that do not include any information about PNs that have been dropped but not confirmed. In such cases, the AN can drop the connection to the PN to free resources immediately as the AT is already not using these resources.

Figure 4:
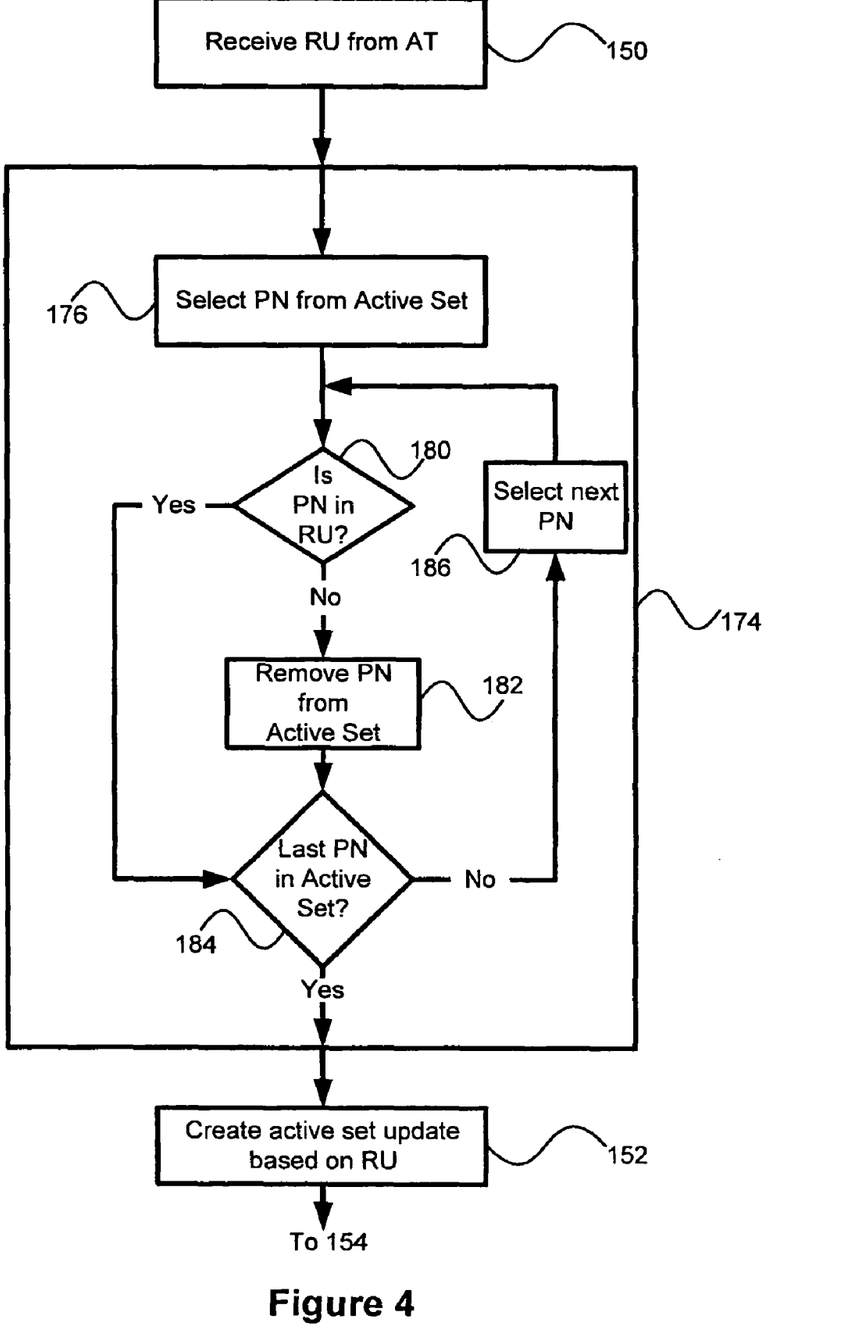
FIG. 4 is a flowchart illustrating a method of dropping connections in response to receipt of a route update message.

As noted above, when an AT receives a TCA instructing it to drop connections, the AT will remove the corresponding PNs from its active set. If the TCC is not received by the AN, the active set maintained by the AN still have these PNs. When the AT next transmits an RU, it will not have these PNs as the AT will have already dropped them. FIG. 4 illustrates a method of removing PNs from the active set maintained by the AN in such an instance. As before, in step 150, an RU is received by the AN. In step 174 the PNs not in the RU are removed from the active set. In one embodiment, this is performed using the steps outlined in step 174. In step 176 the first PN in the active set is selected. A determination of whether or not the PN is in the RU is made in step 180. If the PN is not in the RU, it is deleted from the active set in step 182. Upon either the determination that the PN is in the RU in step 180 or upon completion of step 182 a determination is made in step 184 of whether the selected PN is the last PN in the active set. If there are more PNs in the active set, the next PN is selected in step 186 and the process returns to step 180, otherwise, step 174 is completed. Although illustrated here as being between steps 150 and 152, one skilled in the art will appreciate that this step can be carried out at any point between the receipt of the RU and the transmission of the TCA.

Another phenomenon that frequently results in dropped connection occurs when the AT experiences a sudden drop in pilot signal strength from all sectors that it is connected to. This causes the AT to issue and RU with all PNs set to keep=no. The cause of this phenomenon is typically that the AT is moving through a region of interference, such as a poor service area in a building or between tall buildings. These interruptions are often very brief. The AN can implement now just the serving sector preservation discussed above to maintain the connection, but in instances where all PNs are set to keep=no in the RU, the AN can disregard the message, so that the AT will be able to leave the poor service area without then needing the reconnect. In instances where the AT permanently loses the connection, activity timeout counters can ensure that the resources allocated to the AT are not permanently wasted.

Figure 5:
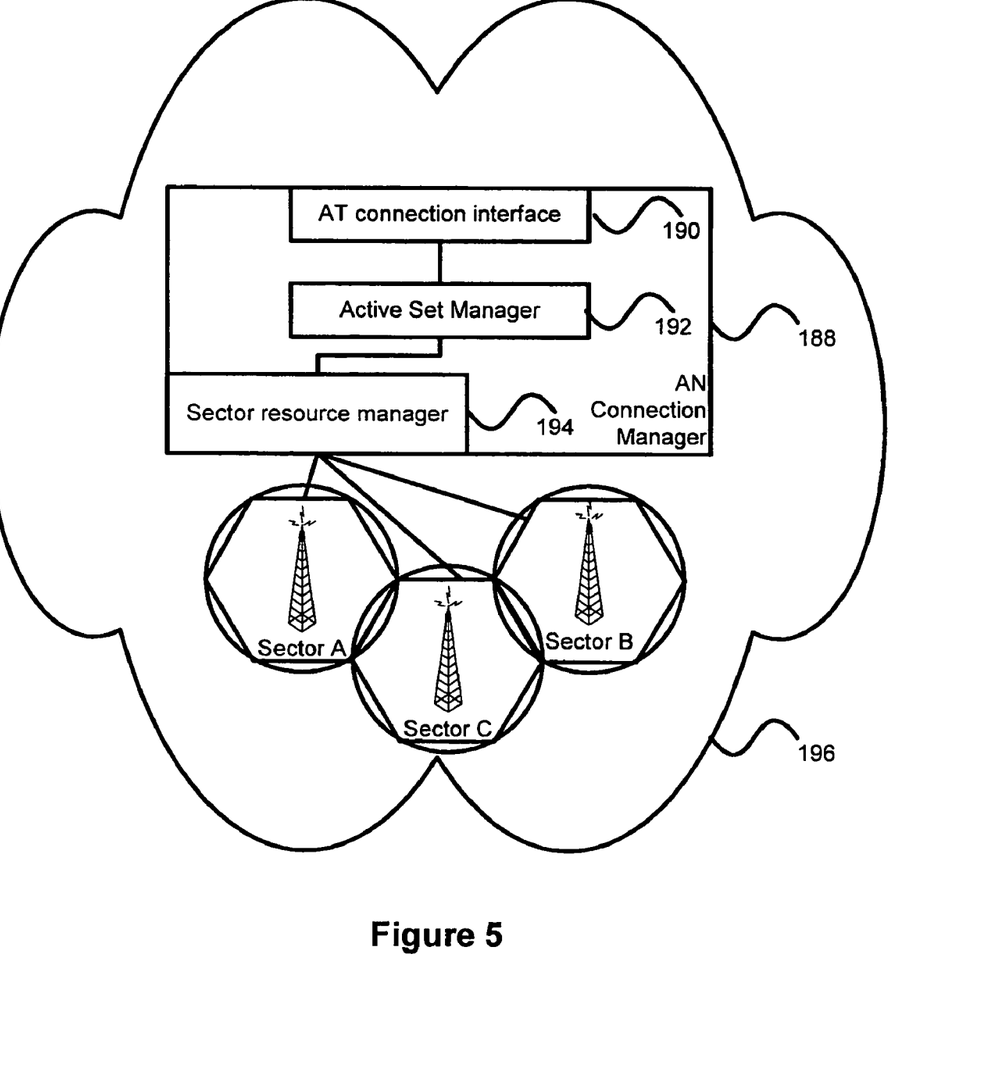
FIG. 5 is a block diagram illustrating an exemplary active network connection manager.

FIG. 5 illustrates an exemplary embodiment of an AN Connection Manager 186 for executing the above-described methods. AN connection manager 186 has an AT connection interface 190, an Active Set Manager 192 and a Sector Resource Manager 194. AN connection Manager 186 operates inside AN 196, which has sectors A, B and C each having a corresponding PN. One skilled in the art will appreciate that the network illustrated in FIG. 5 is simplified for the sake of clarity.

AT connection interface 190 receives RUs from AT's connecting to AN 196. The Active Set Manager 192 creates active set updates and applies changes to the active sets associated with each AT. TCAs generated by the active set manager 192 are issued to ATs through AT connection interface 190 which also receives TCC's. Sector resource manager 194 monitors the resources available in each of the sectors in the network, and communicates with the active set manager 192 so that connection resources can be monitored and allocated.

The following scenarios provide exemplary illustrations of how the method and system of the present invention handle different circumstances.

In the first example, an active set in the AN associated with an AT has three PN codes, PN0, PN1, and PN2. An RU is received from the AT containing three PN codes and statuses, PN1 keep=yes; PN2 keep=no; and PN3 keep=yes. This indicates that PN0 is no longer being used by the AT, and can be immediately removed from the active set to free resources. AN will determine if free resources are available in the sector associated with PN3, and add it to the active set if possible. At this point, the AN active set contains PN1, PN2 and PN3, all of which are referred to in the RU. PN2 can be flagged for removal from the active set upon receipt of the TCC. The TCA is now constructed containing PN1, PN3, and is sent to the AT.

If the AT does not receive the TCA, the AN will not receive the TCC. The active set in the AT will be PN1 and PN2, as it will not have been updated by the TCA. The active set in the AN will contain PN1, PN2 and PN3.

If the AT receives the TCA, but the AN does not receive the TCC, the active set in the AT will be updated based on the TCA. Thus the AT will have an active set of PN1 and PN3. The AN will not remove PN2 because the TCC has not been received, so the active set in the AN will contain PN1, PN2, and PN3.

If the AT receives the TCA and the AN does receive the TCC, the active set in the AT will be updated based on the TCA to be PN1 and PN3. The resulting TCC will confirm to AN that AT has updated its active set to be PN1 and PN3. Because AN receives TCC, PN2 can be removed from the AN active set. In this case, both AT and AN have an active set of PN1 and PN3.

In a second example, the AN contains an active set of PN0, PN1 and PN2, with PN2 being designated as the serving sector. A RU is received containing codes PN1 keep=yes; PN2 keep=no; and PN3 keep=yes. The AN will delete PN0 as it is no longer used by the AT. PN3 will then be added to the active set. Because PN2 is the serving sector, its status is overridden to keep=yes. The TCA is then generated containing PN2 and PN3 and issued to the AT. PN2 may be marked as "to be deleted upon change in serving sectors".

If the AT doesn't receive the TCA, no TCC is returned. The active set in the AT will not be updated, nor will the active set in the AN. The AT active set will contain PN1 and PN2, while the AN active set will contain PN1, PN2 and PN3.

If the AT receives the TCA the active set will be updated to have PN2 and PN3. If no TCC is received by the AN, the AN active set will not be updated, and as a result, it will contain PN1, PN2 and PN3.

If the AT receives the TCA the active set will be updated to have PN2 and PN3. If the TCC is issued by the AT and received by the AN, the AN will then update its active set to PN2 and PN3. This will result in both the AN and AT having the same active set.

At a later juncture, if the AN determines that the AT is using PN3 as the serving sector, the AN can issue another TCA message to the AT removing PN2. If this message is received and replied to, PN2 will be removed from both the AT and AN active sets.

From the above examples it can be seen that the active set at the AN is guaranteed to be a superset of the active set at the AT, with perfect overlap during most instances. This allowance for an allocation of resources in sectors without confirmation that the allocation has been applied to the AT allows for a reduced number of dropped data connections.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of managing connections between an active terminal and connection points in a wireless data network comprising:
   receiving a route update message from the active terminal, said route update message including, a set of pseudorandom number (PN) codes, a connection addition request, and a connection termination request to update an active set of connection channels associated with the active terminal, said active set of connection channels including a plurality of active channels, the plurality of active channels including an active channel designated as a serving sector connection and said set of PN codes including a plurality of PN codes, wherein each connection channel has a different PN code selected from the plurality of PN codes;
   allocating resources for a new connection between the active terminal and a connection point in the wireless data network in accordance with the connection addition request contained in the route update message;
   adding the new connection to the active set of connection channels associated with the active terminal for connecting the active terminal to additional connection points in the wireless data network;
   issuing a channel allocation message to the active terminal, the channel allocation message containing the updated active set of connection channels including the active channel designated as the serving sector connection irrespective of the active channel designated as the serving sector connection being associated with the connection termination request; and
   removing resources allocated to a dropped connection between the active terminal and a connection point in the wireless network from the active set of connection channels, in accordance with the connection termination request contained in the route update message upon confirmation from the active terminal of receipt of the channel allocation message, while maintaining all other connections between the active terminal and connection points in the wireless data network.

2. The method of claim 1 wherein the wireless data network is a 1x Evolution-Data Optimized wireless data network.

3. The method of claim 2 wherein the channel allocation message is a Traffic Channel Allocation message.

4. The method of claim 2 wherein the confirmation from the active terminal of receipt of the channel allocation message is receipt of a Traffic Channel Complete message.

5. The method of claim 2 wherein the route update message includes a set of connection channels, each with an associated status.

6. The method of claim 5 wherein the associated status is selected from a list including add, keep=yes and keep=no.

7. The method of claim 6 wherein the connection addition request includes a pseudorandom number associated with a sector with a status of either add or keep=yes.

8. The method of claim 6 wherein the connection termination request includes listing a pseudorandom number associated with a sector with a status of keep=no.

9. The method of claim 1 wherein the step of allocating resources includes allocating resources for connections in accordance with availability of resources for the connections.

10. The method of claim 9 wherein the step of allocating resources includes determining that sufficient resources are available to permit the new connection.

11. The method of claim 1 wherein the active set of connection channels is determined in accordance with the route update message.

12. The method of claim 11 wherein the active set of connection channels includes channels in the route update message having a status of keep=yes.

13. The method of claim 11 wherein the active set of connection channels includes channels in the route update message associated with a connection addition request.

14. The method of claim 13 wherein the active set of connection channels includes channels in the route update message associated with a connection addition request for which resources have been allocated.

15. The method of claim 1 further including the step of maintaining resources allocated to a connection between the active terminal and a connection point in the wireless network if confirmation from the active terminal of the receipt of the channel allocation message is not received.

16. The method of claim 1 further including the step of modifying the connection termination request in the route update message prior to transmission of the channel allocation message when the connection termination request identifies a the active channel designated as the serving sector connection.

17. The method of claim 16 wherein the step of modifying the connection termination request includes setting a status for a channel to a "to be deleted" state.

18. The method of claim 17 further including the step of issuing a channel allocation message to the active terminal upon receipt of notification of a change of the active channel designated as the serving sector connection, the channel allocation message not including a connection channel corresponding to the connection channel previously having a state of "to be deleted" and the step of removing resources allocated to the connection channel previously having a state of "to be deleted" upon confirmation from the active terminal of receipt of the channel allocation message.

19. The method of claim 1 further including the step of reissuing the channel allocation message to the active terminal if confirmation from the active terminal of receipt of the channel allocation message is not received within a predetermined amount of time.

20. The method of claim 1 further including the step of ignoring connection termination requests in the route update message if the route update message includes connection termination requests for all connections associated with the active terminal.

21. The method of claim 1 further including the step of removing resources allocated to connection channels in the active set associated with the active terminal, if the connection channels are not included in the route update message.

22. A non-transitory machine readable medium tangibly embodying machine readable instructions for implementing an active network connection manager, within a central processor of a wireless data network, for managing connections between sectors of the wireless data network and an active terminal, the active network connection manager comprising:

an active terminal connection interface configured to receive a route update message from the active terminal and to issue a channel allocation message to the active terminal, said route update message including a set of pseudorandom number (PN) codes, a connection addition request, and a connection termination request to update an active set of connection channels associated with the active terminal, said active set of connection channels including a plurality of active channels, the plurality of active channels including an active channel designated as a serving sector connection and said set of PN codes including a plurality of PN codes, wherein each connection channel has a different PN code selected from the plurality of PN codes;

an active set manager configured to add connections to an active set of connection channels associated with the active terminal in accordance with the connection addition requests in the route update message, to generate a channel allocation message for transmission to the active terminal through the active terminal connection interface, the channel allocation message containing the updated active set of connection channels including the active channel designated as the serving sector connection irrespective of the active channel designated as the serving sector connection being associated with the connection termination request, and to remove connections from the active set of connection channels in accordance with the connection termination requests in the route update message upon receipt from the active terminal of confirmation of receipt of the channel allocation message, while maintaining all other connections between the active terminal and connection points in the wireless data network; and a sector resource manager configured to allocate available resources in one of the sectors of the wireless data network to the active terminal in response to the connection addition requests.

* * * * *